US005839055A

United States Patent [19]

Higuchi et al.

[11] Patent Number: 5,839,055

[45] Date of Patent: Nov. 17, 1998

[54] NARROW BAND RADIO TRANSMITTING AND RECEIVING APPARATUS AND METHOD

[75] Inventors: Kazunari Higuchi; Terumi Hakamada; Kazuya Toki, all of Sendai, Japan

[73] Assignee: Matsushita Electric Industrial Co., Ltd., Osaka, Japan

[21] Appl. No.: 538,476

[22] Filed: Oct. 3, 1995

[30] Foreign Application Priority Data

Oct. 5, 1994 [JP] Japan .................................... 6-241223

[51] Int. Cl.[6] ............................ H04B 15/00; H04B 17/00

[52] U.S. Cl. .............................................. 455/62; 455/67.1

[58] Field of Search ............................ 455/38.1, 62, 218, 455/212, 88, 68, 70, 67.1, 67.4, 115, 517, 524; 379/6, 21, 27, 29, 31, 350, 372, 386, 351, 282, 286, 387

[56] References Cited

U.S. PATENT DOCUMENTS

| | | | |
|---|---|---|---|
| 5,392,348 | 2/1995 | Park et al. | 379/386 |
| 5,459,785 | 10/1995 | Noda | 379/386 |
| 5,483,676 | 1/1996 | Mahany et al. | 455/67.4 |
| 5,619,564 | 4/1997 | Canniff et al. | 379/386 |

*Primary Examiner*—Reinhard J. Eisenzopf
*Assistant Examiner*—Marsha D. Banks-Harold
*Attorney, Agent, or Firm*—Ratner & Prestia

[57] ABSTRACT

Between narrow band radio transmitting and receiving apparatuses, method and apparatus for shortening the starting failure time upon start of transmission are disclosed.

By start of transmission at the transmission side, a DTMF signal at 697 Hz to 1633 Hz is outputted from a DTMF generator, and it is changed over to a DTMF signal at 1/10 frequency 0.02 sec later and outputted.

A DTMF receiver at the reception side, when receiving a DTMF signal at 697 Hz to 1633 Hz, cancels the output mute circuit to set in service state. The DTMF receiver, when no longer receiving DTMF signal as a result of changeover to DTMF signal at 1/10 frequency, waits for an ordinary DTMF signal at 1/10 frequency, and cancels the output mute circuit until the end of transmission after reception thereof.

8 Claims, 3 Drawing Sheets

NARROW BAND RADIO TRANSMITTING AND RECEIVING APPARATUS AND METHOD

BACKGROUND OF THE INVENTION

1. Field of the Invention

The present invention relates to a narrow band radio transmitting and receiving apparatus using DTMF (dual tone multi-frequency ) in communication control, and its method.

2. Description of the Prior Art

In the narrow band radio transmitting and receiving apparatus using DTMF signal in communication control, two frequencies in audio frequency band are combined and used as DTMF signal. That is, in order to avoid harmonics often appearing in music and voice as far as possible, one frequency selected from low frequency group of 697 Hz, 770 Hz, 852 Hz, and 941 Hz, and a frequency selected from a high frequency group of 1209 Hz, 1336 Hz, 1477 Hz, and 1633 Hz are combined and used in an inaudible band, and the device is controlled in a state so that a control signal may not be heard in the audible band. In such conventional narrow band radio transmitting and receiving apparatus, to recognize the DTMF signal for assuring communication quality, it takes about 0.1 to 0.2 sec from reception of signal at the reception side until it is controlled to the state ready for producing sound from the speaker. Therefore, if speaking right after start transmission, in the initial phase upon start of communication, the voice of the reception side cannot be produced during the recognition time of the DTMF signal for assuring communication quality, and, as a result, a communicable disabled state occurs initially when starting communication (hereinafter called starting failure) may occur.

SUMMARY OF THE INVENTION

It is hence an object of the invention to solve the problems of the prior art, and present a narrow band radio transmitting and receiving apparatus capable of shortening the starting failure time upon start of communication.

To achieve the object, the invention presents a narrow band radio transmitting and receiving apparatus for assuring communication quality by using DTMF signal in an inaudible band as communication control signal comprising means for setting the DTMF signal frequency of DTMF generator to a frequency selected from a first frequency group upon start in the initial phase of communication start, and controlling the frequency of the DTMF signal to a frequency of a second frequency group lower than the first frequency upon start of speech at the transmission side, and control means for setting the reception side in service state by receiving a DTMF signal in the first frequency group at the reception side.

In the invention, therefore, the time from reception of signal at the reception side until controlled to be ready to start voice output from the speaker is shortened, for example, to 1/10 or 0.01 to 0.02 sec, so that starting failure is avoided.

DESCRIPTION OF THE PREFERRED EMBODIMENT

Figure 1:
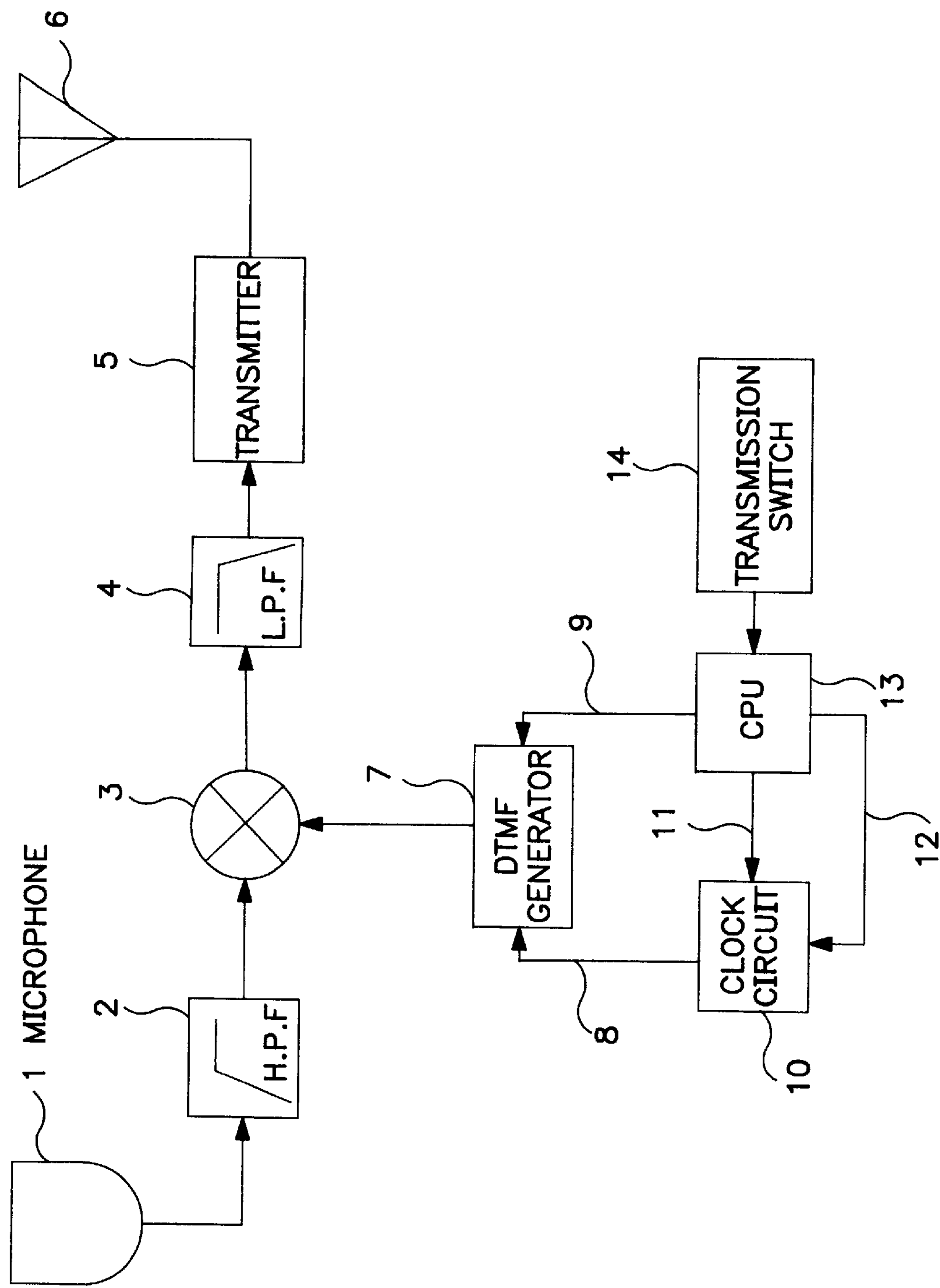
FIG. 1 is a schematic block diagram at transmission side of a narrow band radio transmitting and receiving apparatus in an embodiment of the invention.

Referring now to the drawings, an embodiment of the invention is described below.

FIG. 1 is a schematic block diagram at transmission side of a narrow band radio transmitting and receiving apparatus of the invention. In FIG. 1, reference numeral 1 is a microphone, 2 is a high pass filter passing audio signals of 300 Hz or more, and cutting off below 300 Hz, 3 is a mixing circuit for mixing an audio signal passing through the high pass filter 2, and a signal from a DTMF generator 7 described below, and 4 is a low pass filter connected to the output side of the mixing circuit 3. Reference numeral 5 is a transmitter for transmitting a signal passing through the low pass filter 4, and 6 is a transmission antenna of the transmitter 5.

In the DTMF generator 7, a clock signal 8 sent out from a clock signal 10 is supplied, and also a DTMF output control signal 9 sent out from a CPU 13 is supplied. Furthermore, from the CPU 13 to the clock circuit 10, a clock speed control signal 11 and a clock stop control signal 12 for controlling operation and stop of the DTMF generator 7 by controlling oscillation and stop of clock are supplied. A transmission switch 14 for starting transmission is connected to the CPU 13.

Figure 2:
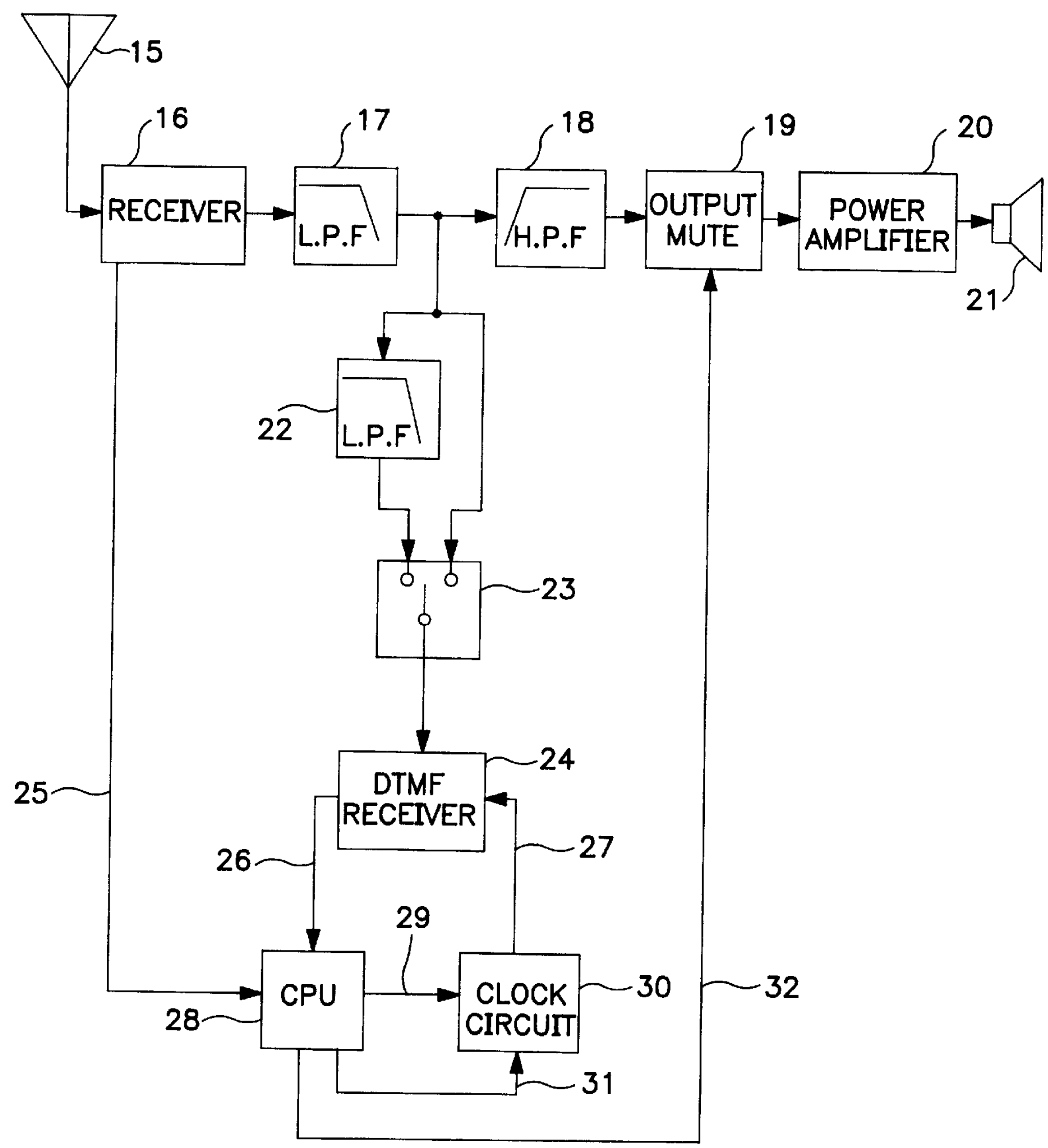
FIG. 2 is a schematic block diagram at reception side of a narrow band radio transmitting and receiving apparatus in an embodiment of the invention.

FIG. 2 is a schematic block diagram at reception side of a narrow band radio transmitting and receiving apparatus of the invention. In FIG. 2, reference numeral 15 is a reception antenna, 16 is a receiver for receiving radio waves coming to the reception antenna 15, 17 is a low pass filter for passing low tone DTMF signal of 69.7 to 163.3 Hz and audio signal of 300 Hz to 3 kHz connected to the receiver 16, and cutting off over 3 kHz, 18 is a high pass filer connected to the low pass filter 17 for cutting off low tone DTMF signal of 69.7 to 163.3 Hz, 19 is an output mute circuit connected to the output side of the high pass filter 18, 20 is a power amplifier for amplifying a signal sent out from the output mute circuit 19, and 21 is a speaker connected to the power amplifier 20.

Reference numeral 22 is a low pass filter for passing the low tone DTMF signal of 69.7 to 163.3 Hz connected to the output side of the low pass filter, and cutting off audio signal of 300 Hz to 3 kHz, 23 is a filter pass selection switch for selecting either a signal passing through the low pass filter 17 or a signal passing through other low pass filter 22, and 24 is a DTMF receiver for detecting the DTMF from a signal selected from the filter pass selection switch 23 passing through the signal without passing through the low pass filter 22 in the case of high tone operation, and the DTMF detection signal 26 detected by this DTMF receiver 24 is sent out to a CPU 28, and a clock signal 27 sent out from a clock circuit 30 is supplied to the DTMF receiver 24.

In the CPU 28, a squelch signal 25 is fed from the receiver 16, and from the CPU 28 to the clock circuit 30, a clock speed control signal 29 or a clock stop control signal 31 for controlling operation and stop of the DTMF receiver 24 by controlling oscillation and stop of clock is supplied, and a mute-off signal 32 is supplied into the output mute circuit 19.

In thus constituted embodiment, the operation is described below.

In FIG. 1, when transmission is started by manipulating the communication switch 14, the CPU 13 sets the control signal to be outputted by the DTMF generator 7 by the DTMF output control signal 9, and simultaneously instructs cancellation of mute to the clock signal 10. At this time, since the clock speed of the clock circuit 10 is set at 1/1, the DTMF generator 7 outputs a DTMF signal set at a frequency of 697 Hz to 1633 Hz (hereinafter called high tone).

On the other hand, the CPU 13, 0.02 sec after high tone output, instructs the clock signal 10 to change so that the clock speed may be 1/10 by the clock speed control signal 11. Accordingly, the operation speed of the DTMF generator 7 becomes 1/10, and the DTMF generator 7 outputs a DTMF signal corresponding to the frequency at 1/10 of high tone frequency, that is, a DTMF signal set at frequency of 69.7 Hz to 163.3 Hz (hereinafter called low tone), and this state is maintained until the end of transmission.

The low tone DTMF signal sent out from the DTMF generator 7 is mixed with the speech sound from the microphone 1 passing through the high pass filter 2 in the mixing circuit 3, and passes through the low pass filter 4, and is sent from the transmitter 5 through the transmission antenna 6.

In FIG. 2, when the receiver 16 receives some signal, by sending out a squelch signal 25 from the receiver 16, reception is reported to the CPU 28. As a result, in the CPU 28, cancellation of mute is instructed to the clock circuit 30. At this time, the clock speed of the clock circuit 30 is set at 1/1, and thereby the DTMF receiver 24 waits for high tone.

The receiver 16, at the same time, supplies the reception signal to the low pass filter 17, and part of the signal passing through the low pass filter 17 passes through the high pass filter 18, and is supplied into the output mute circuit 19, while the other portion is supplied into the filter pass selection switch 23 directly or through the low pass filter 22. The filter pass selection switch 23 selects either high tone or low tone received by the receiver 16, and supplies into the DTMF receiver 24.

When the DTMF receiver 24 waiting for high tone has received high tone, the DTMF receiver 24 sends out a DTMF detection signal 26 to report reception to the CPU 28, and a mute-off signal 32 is sent out from the CPU 28, and the mute of the output mute circuit 19 is canceled to set in service state.

When the transmitter side is changed from high tone to low tone, the DTMF receiver 24 cannot receive the DTMF signal, and the DTMF signal receive disabled status is reported to the CPU 28, and at the same time the CPU 28 instructs the clock circuit 30 to change the clock speed to 1/10 by the clock speed control signal 29. As a result, the operation speed of the DTMF receiver 24 is changed to 1/10, thereby waiting for low tone. At the same time, the CPU 28 starts its built-in 0.2 sec timer to wait for report of reception from the DTMF receiver 24.

When the filter pass selection switch 23 selects the low tone received by the receiver 16 and the DTMF receiver 24 receives low tone, a DTMF detection signal 26 is sent out to the CPU 28 to report reception to the CPU 28, and the CPU 28 continues cancellation of the output mute circuit 19 until end of transmission by the mute-off signal 32. When DTMF signal is not received, the CPU 28 sets the output mute circuit 19 in mute state.

Figure 3:
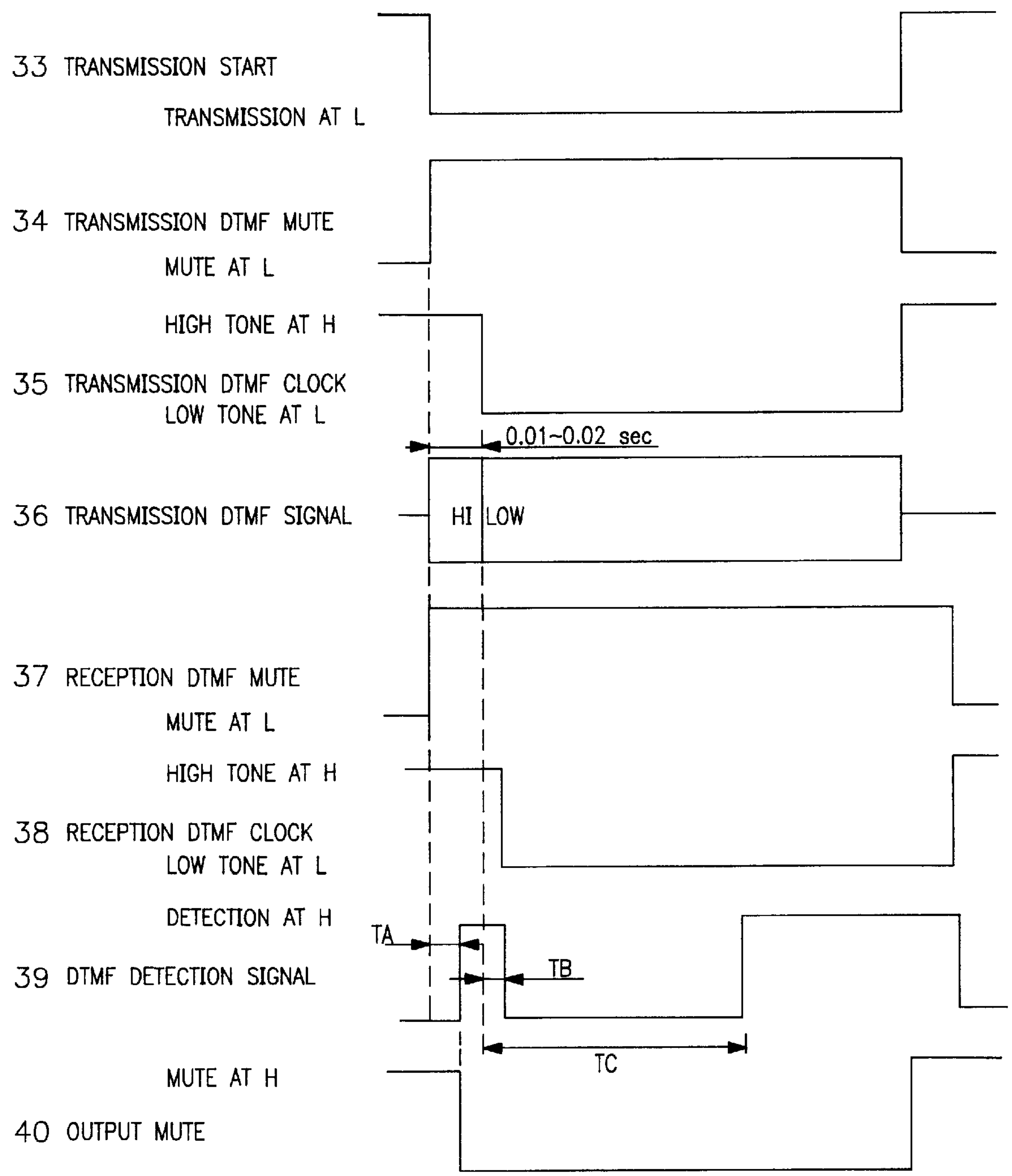
FIG. 3 is an operation timing waveform diagram of a narrow band radio transmitting and receiving apparatus in an embodiment of the invention.

FIG. 3 is a control timing chart of the narrow band radio transmitting and receiving apparatus of the invention.

When a transmission start signal 33 becomes L, the transmission DTMF mute signal 34 becomes H, and the mute is canceled. The transmission DTMF signal 36 is initially outputted in high tone, and in 0.01 to 0.02 sec after start of transmission, the transmission DTMF clock 35 is changed to L, and the transmission DTMF signal 36 is changed over to low tone.

A reception DTMF mute signal 37 becomes H (cancel) when receiving the transmission DTMF signal 36, and a DTMF detection signal 39 is in reception state (H) by delay of high tone DTMF signal detection time ta (0.01 to 0.02 sec), and a output mute signal 40 becomes L, thereby canceling the mute.

Or, as the transmission DTMF signal 36 changes from high tone to low tone, the DTMF detection signal 39 is set in receive disabled state (L) by delay of DTMF signal extinction detection time tb (0.005 to 0.015 sec), and a reception DTMF clock 38 changes for low tone (L), thereby waiting until the DTMF detection signal 39 becomes reception state (H) by a timer of 0.1 to 0.2 sec. Consequently, the DTMF detection signal 39 comes in reception state (H) by delay of low tone DTMF signal detection time tc (0.1 to 0.2 sec). At this time, the output mute signal 40 keeps the mute state (L) until end of reception. If the DTMF detection signal 39 does not become reception state (H), the output mute signal 40 becomes H, thereby becoming mute state.

Thus, in this invention, the starting failure time in the initial phase of communication start can be shortened.

According to the invention, as described herein, by setting the frequency of the DTMF signal in the initial phase of communication start is set at 697 Hz to 1633 Hz, and controlling the frequency of the DTMF signal to 1/10 of the frequency of initial phase of communication start in the initial phase of speech start, the initial failure time upon start of speech can be shortened in the narrow band radio transmitting and receiving apparatus using DTMF signal in communication control.

In the foregoing embodiment, the frequency of the DTMF signal in the initial phase of speech start is divided to 1/10 of the frequency in the initial phase of communication start, but the dividing ratio is not limited to this, but may be freely set at 1/15, 1/20, etc.

What is claimed is:

1. A narrow band radio transmitting and receiving apparatus for use with a DTMF signal comprising:
   - a transmission block for transmitting an audio signal and the DTMF signal,
   - the transmission block including:
     - a DTMF generator for generating a plurality of DTMF signals, one of the plurality of DTMF signals having a first frequency and another of the plurality of DTMF signals having a second frequency lower than the first frequency,
     - a clock circuit for generating a clock signal for driving the DTMF generator,
     - a CPU for controlling the operation of the DTMF generator and the clock circuit, and
     - a mixing circuit for mixing the audio signal and the DTMF signal, and
     - a reception block for a) receiving the audio signal and the DTMF signal transmitted from the transmission block, and b) reproducing the audio signal,
     - the reception block including:
       - a receiver for receiving the transmitted signals,
       - selecting means for selecting one of the DTMF signals at the first frequency or the second frequency.
       - a DTMF receiver having an operation speed for detecting the DTMF signals selected from the selecting means, a CPU having a clock speed and being controlled by the DTMF signal detected by the DTMF receiver, a clock circuit for controlling a clock speed by the CPU and the operation speed of the DTMF receiver, an output mute circuit controlled by the CPU, and means for reproducing the audio signal responsive to the output mute circuit.

2. A method of transmitting and receiving narrow band signals using a narrow band radio having a reception side and using a DTMF signal as a communication control signal comprising the steps of:

(a) setting the DTMF signal in an initial communication phase to a first frequency selected from a first frequency group, (b) setting the DTMF signal upon a start of speech to a second frequency of a second frequency group lower than the first frequency of the first frequency group, (c) transmitting the DTMF signal, (d) controlling the reception side into a receive state corresponding to the first frequency when receiving the DTMF signal having the frequency of the first frequency group, and (e) controlling the reception side into a receive state corresponding to the second frequency after receiving the DTMF signal of the first frequency.

3. A narrow band radio transmitting and receiving apparatus having a transmission side for transmitting a signal, a reception side for receiving a signal, and a DTMF generator and using a DTMF signal as a communication control signal comprising:

a first setting means for setting the DTMF generator to generate a DTMF signal of a first frequency at an initial communication phase of the radio transmitting and receiving apparatus, a second setting means for setting the DTMF generator to generate a DTMF signal of a second frequency lower than the first frequency, to start a speech communication phase of the radio transmitting and receiving apparatus, wherein the second setting means sets the DTMF generator after the first setting means sets the DTMF generator, control means for initializing the reception side of the narrow band radio transmitting and receiving apparatus responsive to the DTMF signal, and means provided in the reception side for canceling muting of the reception side after reception of the DTMF signal of the second frequency.

4. A narrow band radio transmitting and receiving apparatus of claim 3, wherein the second frequency is a frequency divided from the first frequency.

5. A narrow band radio transmitting and receiving apparatus of claim 3, wherein the first frequency is selected from 697 Hz to 16333 Hz and the second frequency is $\frac{1}{10}$ of the first frequency.

6. A narrow band radio transmitting and receiving apparatus of claim 5, wherein the first frequency is obtained from a combination of a first frequency group of 697 Hz, 790 Hz, 852 Hz, and 941 Hz and a second frequency group of 1209 Hz, 1366 Hz, 1477 Hz and 1633 Hz.

7. A narrow band radio transmitting and receiving apparatus of claim 3, wherein the second setting means sets the DTMF generator 0.01 to 0.02 sec later than that of the first setting means.

8. A narrow band radio transmitting and receiving apparatus of claim 3, further comprising:

a first setting means for setting a DTMF receiver to receive a DTMF signal of the first frequency at the initial communication phase of the radio transmitting and receiving apparatus, a second setting means for setting a DTMF receiver to receive a DTMF signal of the second frequency lower than the first frequency, to start the speech communication phase of the radio transmitting and receiving apparatus, the second setting means set the DTMF receiver after the first setting means set the DTMF receiver.

* * * * *